United States Patent Office 3,585,150
Patented June 15, 1971

3,585,150
FOAM INHIBITED $CO_2$ REGENERATIVE AMINE ABSORBENT COMPOSITIONS
Paul R. Gustafson, Washington, D.C., and Roman R. Miller, Silver Spring, Md., assignors to the United States of America as represented by the Secretary of the Navy
No Drawing. Filed Nov. 20, 1967, Ser. No. 684,469
Int. Cl. B01d
U.S. Cl. 252—321                                   4 Claims

ABSTRACT OF THE DISCLOSURE

The effective foam control life of silicone anti-foam compositions is extended by including aminoalkanesulfonic acids and their salts. Even greater anti-foam protection is provided by further adding a glycine compound or salt to the composition. Addition of the novel compositions of this invention to monoethanolamine scrubber solutions appreciably increases the effective life of such solutions over that possible using a silicone anti-foam agent alone.

---

The invention described herein may be manufactured and used by or for the Government of the United States of America for governmental purposes without the payment of any royalties thereon or therefor.

BACKGROUND OF THE INVENTION

Field of the invention

This invention relates to new and improved anti-foam compositions. More particularly the invention relates to new silicone base anti-foam compositions containing aminoalkanesulfonic acids or their salts which prolong the effective anti-foaming life of the composition. The new silicone compositions may also employ glycines and their salts to further improve the effective anti-foaming properties of the composition. In particular the foaming propensity of amine solutions, used for removing acidic gases from fluids, is significantly decreased using metallic taurine salts and, if desired, glycine salts.

DESCRIPTION OF THE PRIOR ART

The use of silicones, polyorganosiloxanes, as anti-foam agents in lube oil formulations, vacuum towers, Udex units, amine scrubbers, and in the processing of crude oil is well known. The polyorganosiloxanes are also extensively used to control foam produced in amine scrubbers during the removal of acid gases, for example, hydrogen sulfide and carbon dioxide, from various industrial refinery gases or from an environment where the particular acidic gas has reached an undesirable level as, for example, on submarines. In most applications, silicone anti-foam is conventionally added at 10 to 500 parts per million to at least temporarily solve foaming problems.

A serious drawback in the use of silicone compositions for controlling foam is the relatively short effective life of the additive on foaming. For example, during fermentations such as penicillin production, requiring 4 to 10 days fermentation, an abundant foam is produced which seriously limits the capacity of fermentation tanks. In addition, production is further hampered by reduced in-process efficiency caused by the foam physically carrying away part of the inoculum from the bulk medium. Furthermore, entire batches of fermentation media are on occasions discarded due to contaminated foam falling back into tanks. In addition, to foaming problems experienced in commercial fermentations and other industrial processes, foaming in amine scrubber solutions is a particular problem in confined areas where it is used to remove acidic gases from the environment.

Monoethanolamine (MEA) solutions are used on shipboard, particularly submarines, to remove carbon dioxide from the environment. Foaming is one of the principal causes of amine carryover from the stripper to carbon dioxide compressors used to compress the carbon dioxide removed, by the amine, from the environment. This carryover causes breakdown of the compressors requiring extensive repair time and in some cases replacement of the entire unit. In order to prevent equipment failure, silicone protected MEA solutions are replaced with a fresh charge whenever foaming persists. Because of the short life of the silicone in preventing foam of the MEA, this necessitates frequent and costly replacement of the solution with fresh charges.

SUMMARY

The present invention employs aminoalkanesulfonic acids particularly lower alkane homologs, for example, the 2-aminoethane derivatives (taurines), the 3-amino propane derivatives, etc., to extend the anti-foaming life of silicone compositions used to control foam of monoethanolamine and other $CO_2$ regenerative amine absorbents. N-substituted lower alkyl taurinates with the alkyl groups containing from one to six carbons are particularly preferred, especially the methyl derivative. To further extend the life of the silicone anti-foam composition a glycine or its salt is employed for example, potassium glycinate, the monosodium salt of N,N-diethanol glycine or the like. The advantage of the instant anti-foam compositions is to prolong the normal operational period without foaming which is obtained by using silicone alone. This means fewer replenishments of amine, less carryover of foam harming expensive equipment, reduced cost of operation because of the more uniform and dependable service requiring less diligent monitoring of the operation, a cleaner environment, and many other advantages obtainable by suppressing foam for a longer period of time.

Therefore, an object of this invention is to provide an improved process for increasing the productivity or improving the operation of commercial processes treating materials that tend to foam by suppressing foam for a longer period than heretofore possible using silicone alone.

Still another object of this invention is to provide an improved foam inhibited monoethanolamine scrubber solution.

DESCRIPTION OF THE PREFERRED EMBODIMENTS

The foam inhibiting compositions of this invention consists of three or more ingredients. The first ingredients are dialkyl silicone polymer-based anti-foam agents as taught by Vogel et al., 3,033,786. Exemplary of such agents useful in this invention are Dow Corning antifoams A, B, and H–10 which contain 100%, 10%, and 10% active dimethyl polysiloxane, respectively. Amounts as low as 5 parts per million up to quantities of better than 500 parts per million reduce the foaming tendencies of various materials including aqueous monoethanolamine scrubber solutions.

The second ingredient of the anti-foam composition is aminoalkanesulfonic acids, particularly the lower alkane homologs such as taurines, taught by Patent 2,857,370 to Sundberg or 3-amino propane sulfonic acid or the like. The metal salts of these acids, for example, sodium, potassium, or the like are preferred because the anti-foam composition of this invention is primarily intended for alkaline monoethanolamine solutions which immediately neutralize the acid when combined. Where the composition is used in a neutral or acid medium, for example fermentation medium, the acid itself may be employed. While the taurines as a family are well known surface active agents with ability to break petroleum emulsions, we have found that these materials are particularly effective in prolonging the foam suppression obtained using silicones. Particularly useful for MEA solutions are the N-substituted lower alkyl taurines; the alkyl substituent having from 1 to 6 carbon atoms. The sodium salt of N-methyl taurine, for example, has been found to at least double the foam suppression time for silicone compositions applied to MEA. While a simple combination of silicone and aminoalkanesulfonic acid compounds is sufficient to unexpectedly prolong the nonfoaming of MEA and other foaming materials, the composition is further improved by adding a glycine. The metal salts of glycine are preferred since the anti-foam composition is primarily intended for basic media, such as amines particularly MEA. The use of a glycine in the composition enables the quantity of aminoalkanesulfonic acid or salt used to be reduced while maintaining equivalent anti-foaming properties. This allows one to use a combination of the two foam suppressors at a lower over-all weight level than is possible if either foam suppressant is used alone.

When employing a combination of an aminoalkanesulfonic acid compound and glycine, a ratio of from 10 to 0.1 parts of a glycine or its salts to one part of the acid or its salts by weight, is sufficient.

When employing the anti-foam composition of this invention the composition is added to the foamy material to provide up to 50% of sulfonic acid and/or glycine by weight of the monoethanolamine solution. In practice, as will become more apparent from the examples, proportions up to 15% for a single ingredient are necessary while generally proportions of less than 5% by weight of amine solutions will suffice where a mixture of the aminoalkanesulfonic acid compound and a glycine are used.

If desired a fourth ingredient is added to the composition as a carrier. For example, the anti-foam agent is carefully dissolved in MEA and then the glycine and taurine salts incorporated to prepare an easily dispersable anti-foam for MEA solutions. In a similar manner, a water base is used to prepare anti-foam agents intended for use in aqueous environments, for example, fermentation media.

The following examples are given to further illustrate the present invention which, however, are not to be considered to be as limitative thereof. All parts are given by weight except where noted.

Example 1.—A 4.5 normal MEA aqueous solution was prepared and one hundred parts per million "Dow Corning anti-foam B" added. The solution was placed in a glass column approximately ¾ inch in diameter by 9 inches high. 3.3 liters per minute of air containing one percent $CO_2$ at 88° F. was passed through a glass frit into the MEA solution. The foam height was measured at four inches above liquid level in the column for the first hour and thereafter varied between 5 to 7 inches. On addition of one percent (by volume) of sixty-five percent sodium methyl taurine in water the foam column immediately fell from 6 inches on the average to ¾ of one inch and remained that way with no change for the next ninety minutes of the run. At the end of 4½ days of operation this MEA treated with silicone and one percent taurinate had a foam height averaging only 2 inches which is considerably lower than the average foam height of the MEA without taurinate after only one hour operation.

Example 2.—The test described in Example 1 was repeated but 2%, by volume, of 65% sodium methyl taurinate added to the MEA silicon solution. During a period of 24 hours the foam height in the column was observed to vary from ¾ to 1½ inches in height indicating superior foam suppression and a longer effective time of foam suppression caused by the taurinate.

Example 3.—Equal parts of MEA and the potassium salt of 3-amino propane sulfonic acid were mixed and used to absorb $CO_2$ in a manner similar to the previous examples. A higher proportion of the propane homolog was employed because it acts as a good absorbent whereas the taurines do not absorb well. The foam height after prolonged absorption of $CO_2$ was two inches or less than one third the normal foam height.

Example 4.—A 4.5 MEA solution was prepared containing 100 parts "Dow Corning anti-foam emulsion B." To this was added one and one-half percent of the monosodium salt of di-ethanol glycine. About three liters per minute of air containing one percent $CO_2$ at 88° F. was passed through the solution. After 25 hours the foam column measured 2 inches and the bubble size tended to be small. Addition of the glycine improved considerably the foam suppression ability of the silicone as is evident by comparison with Example 1.

Example 5.—A solution was prepared as in Example 4 except that in addition to the materials specified therein one percent sodium methyl taurinate was added. After forty hours the foam column measured a mere ¾ of an inch showing improved and extended foam suppression due to the addition of the taurine. In addition, the taurine had modified the bubble size causing large bubbled foam whereas the glycine treated MEA produced small bubbles. By adjusting the quantity of glycine and taurine added, the foam bubble size may be controlled.

Example 6.—4.5 normal MEA solution was prepared with 500 parts per million "Dow Corning anti-foam A" added. (The large quantity of anti-foam was employed due to the difficulty experienced in dispersing the anti-foam agent in the MEA.) Air containing 1% $CO_2$ was passed through the MEA placed in a glass column in a manner similar to that described for Examples 1–5. Initially the anti-foam A stops foaming completely, however, after 5 minutes it proved ineffective there being observed a 7 to 8 inch column of foam above the liquid level.

Example 7.—MEA solution containing anti-foam A was prepared as in Example 6. To this was added 12.5% of potassium salt of glycine (potassium glycinate). The average foam height of the column was found to be one third of the length where only the silicon is employed.

Example 8.—Sodium methyl taurinate was added to the silicone treated MEA, prepared as per Example 6, at a level of 6.5%. The foam column was ⅛ the length of MEA solution treated with silicone alone.

Example 9.—A combination of 1.3% sodium methyl taurinate and 5.0% potassium glycinate was employed rather than the single compound used in Examples 7 and 8 and was found to reduce the original foam column to one forth that of foam columns for MEA solutions treated with silicone alone.

Example 10.—The quantities of sodium methyl taurinate and potassium glycinate employed in Example 9 were further reduced to 0.6% and 2.5% respectively. This combination when added to silicon treated MEA reduced the foam column to ⅔ its original length. While this quantity of additive proves somewhat less effective than in Example 9 it improved foam suppression using very low levels of the combined additive.

Example 11.—100 parts per million "Dow Corning anti-foam emulsion H-10," designed for general use in hot aqueous systems, was added to the standard 4.5 normal MEA solution and 3 liters of air having 1% $CO_2$ passed therethrough. After 8 hours large bubble formation was apparent and a foaming problem existed. When a sodium methyl taurinate silicone combination was used the length of time of foam suppression was doubled.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A relatively non-foaming $CO_2$ regenerative amine absorbent composition consisting essentially of:
   5 to 500 p.p.m. by weight dimethyl polysiloxane;
   50% to 95% by weight of an aqueous monoethanolamine $CO_2$ regenerative absorbent composition; and
   5% to 50% by weight of a compound selected from the group consisting of aminoalkanesulfonic acid wherein the alkane has from one to six carbon atoms, and a metal salt of N-alkyl substituted taurine in which the alkyl radical has from one to six carbon atoms.

2. The composition of claim 1 including a metal salt of glycine selected from the group consisting of the monosodium salt of N,N-diethanol glycine and potassium glycinate present in amounts of 10 to 0.1 part of glycine salt per part of animoalkanesulfonic acid or per part of the metal salt of N-alkyl substituted taurine.

3. The composition of claim 1 wherein the metal salt of N-alkyl substituted taurine is sodium methyl taurinate.

4. The composition of claim 1 wherein the metal salt of N-alkyl substituted taurine is potassium methyl taurinate.

References Cited

UNITED STATES PATENTS 3,033,786    5/1962    Vogel et al. _____ 252—351

FOREIGN PATENTS 667,649    4/1950    Great Britain _____ 252—351

JOHN D. WELSH, Primary Examiner

U.S. Cl. X.R.

252—358; 55—87